US012679655B2

(12) United States Patent
Mohanarajah et al.

(10) Patent No.: US 12,679,655 B2
(45) Date of Patent: Jul. 14, 2026

(54) CONTROL SYSTEM AND CONTROL METHOD FOR AUTOMATED WAREHOUSE SYSTEM

(71) Applicant: Rapyuta Robotics Co., Ltd., Tokyo (JP)

(72) Inventors: Gajamohan Mohanarajah, Tokyo (JP); Arudchelvan Krishnamoorthy, Tokyo (JP); Seiji Shigaki, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 406 days.

(21) Appl. No.: 18/454,226

(22) Filed: Aug. 23, 2023

(65) Prior Publication Data

US 2024/0262627 A1    Aug. 8, 2024

Related U.S. Application Data

(63) Continuation-in-part of application No. PCT/JP2023/016603, filed on Apr. 27, 2023, and a
(Continued)

(51) Int. Cl.
*B65G 1/137*            (2006.01)

(52) U.S. Cl.
CPC .................................. *B65G 1/1378* (2013.01)

(58) Field of Classification Search
CPC .... B65G 1/1378; B65G 1/0492; G06Q 10/08;
G06Q 10/087
See application file for complete search history.

(56) References Cited

U.S. PATENT DOCUMENTS

| | | | |
|---|---|---|---|
| 11,401,110 B2 * | 8/2022 | Li | B66F 9/063 |
| 2016/0009493 A1 | 1/2016 | Stevens et al. | |

(Continued)

FOREIGN PATENT DOCUMENTS

| | | |
|---|---|---|
| JP | 2009-286617 A | 12/2009 |
| JP | 2017-522247 A | 8/2017 |

(Continued)

OTHER PUBLICATIONS

International Search Report and Written Opinion mailed on Nov. 28, 2023 in the PCT Application No. PCT/JP2023/033480.

*Primary Examiner* — Jacob S. Scott
*Assistant Examiner* — Miraj T. Patel
(74) *Attorney, Agent, or Firm* — Trupti P. Joshi

(57) ABSTRACT

A control system for an automated warehouse system (1) includes a controller (51) controlling the automated warehouse system (1), the automated warehouse system (1) including: a rack (10) for arranging at least one storing bin (20) for storing at least one item (23); a plurality of picking stations (40) for picking the item (23) from one or more of the storing bins (20) to one or more shipping bins (20A) for containing an item (23) to be shipped; and a plurality of transportation robots (30) for transporting the storing bin (20) and the shipping bin (20A). The controller (51) controls one or more of the transportation robots (30) to separately transport, among the one or more shipping bins (20A), at least a shipping bin (20A) for a first ship-to destination and a shipping bin (20A) for a second ship-to destination to the picking station (40) and controls one or more of the transportation robots (30) to transport the one or more storing bins (20) to the picking station (40), the one or more storing bins (20) each containing the item (23) for the first ship-to destination and the second ship-to destination.

20 Claims, 10 Drawing Sheets

Related U.S. Application Data continuation-in-part of application No. 18/304,407, filed on Apr. 21, 2023, now Pat. No. 12,595,125, and a continuation-in-part of application No. PCT/JP2023/006764, filed on Feb. 24, 2023.

(60) Provisional application No. 63/482,805, filed on Feb. 2, 2023.

(56)                References Cited

U.S. PATENT DOCUMENTS

| | | |
|---|---|---|
| 2021/0221615 A1 | 7/2021 | Buchmann |
| 2022/0234831 A1 | 7/2022 | Szyszkowski et al. |

FOREIGN PATENT DOCUMENTS

| | | |
|---|---|---|
| JP | 2021-15606 A | 2/2021 |
| WO | WO 2021/122218 A1 | 6/2021 |

* cited by examiner

_1_

| ORDER LINE 1 (FIRST SHIP–TO DESTINATION) | ITEM A × 1 |
| | ITEM B × 1 |
| ORDER LINE 2 (SECOND SHIP–TO DESTINATION) | ITEM B × 1 |
| | ITEM C × 1 |
| ORDER LINE 3 (THIRD SHIP–TO DESTINATION) | ITEM D × 1 |
| | ITEM E × 1 |

*Fig.7*

CONTROL SYSTEM AND CONTROL METHOD FOR AUTOMATED WAREHOUSE SYSTEM

CROSS-REFERENCE TO RELATED APPLICATIONS

The present application claims the benefit of priority from U.S. Provisional Application No. 63/482,805, filed on Feb. 2, 2023; and is a continuation-in-part of International Patent Application No. PCT/JP2023/006764, filed on Feb. 24, 2023; a continuation-in-part of U.S. Non-provisional application Ser. No. 18/304,407 filed on Apr. 21, 2023; and a continuation-in-part of International Patent Application No. PCT/JP2023/016603, filed on Apr. 27, 2023; the contents of each of which are hereby incorporated by reference in their entireties.

TECHNICAL FIELD

The present disclosure relates to a control system and a control method for an automated warehouse system.

BACKGROUND ART

For example, International Publication No. WO 2018/189110 discloses a warehouse including a storage rack and an order-preparation station, a tray storing an item is arranged on the storage rack, and an operator handles an order in the order-preparation station. In the order-preparation station, the operator picks the item from the tray transported by an automatic device, thereby preparing a delivery package on an order-by-order basis.

In an order-preparation station, for example, in preparing one delivery package requiring a plurality of types of items, an operator usually puts the different types of items from separate trays in the delivery package. When completing the one delivery package, the operator starts preparation of the next delivery package. Such picking is significantly inefficient.

The present disclosure has been made in view of the above problem and an object of the present disclosure is to provide a control system and a control method for an automated warehouse system that make it possible to perform picking with a significant efficiency.

SUMMARY

A control system for an automated warehouse system according to an aspect of the present disclosure includes a controller controlling the automated warehouse system, the automated warehouse system including: a rack for arranging at least one storing bin for storing at least one item; a plurality of picking stations for picking the item from one or more of the storing bins to one or more shipping bins for containing an item to be shipped; and a plurality of transportation robots for transporting the storing bin and the shipping bin, in which the controller controls one or more of the transportation robots to separately transport, among the one or more shipping bins, at least a shipping bin for a first ship-to destination and a shipping bin for a second ship-to destination to the picking station, and the controller controls one or more of the transportation robots to transport the one or more storing bins to the picking station, the one or more storing bins each containing the item for the first ship-to destination and the second ship-to destination.

The items for the first ship-to destination and/or the second ship-to destination are contained in a plurality of the storing bins.

The controller further controls the transportation robot to transport the shipping bin in which the picking of the item is completed to the rack from the picking station.

The controller further controls the transportation robot to perform temporal evacuation of the shipping bin in which the picking of the item is not completed to the rack.

The transportation of the storing bins by the transportation robot having a longer distance or a longer time to the picking station is performed in priority.

The storing bins containing the items more frequently used for the picking of the items are located closer to the picking station prior to the picking of the items.

In a case where one or more of the storing bins are in a different picking station, the one or more storing bins storing the item necessary for the picking to the shipping bin in which the picking is not completed, the controller further controls the transportation robot to perform transportation of the shipping bin in which the picking of the item is not completed to the picking station different from the picking station.

The rack includes a plurality of floors, the picking station defines a surface extending from a surface of one of the plurality of floors, and the transportation robot is travelable along the surface of the floor and the surface of the picking station.

The automated warehouse system includes a guide mechanism providing a guide indicating which one of the items is to be picked and from which one of the storing bins and to which one of the shipping bins the item is to be picked in the picking station, and the controller further controls the guide mechanism in accordance with the picking of the item.

The guide indicating which one of the items is to be picked is provided in an order of the picking becoming possible as the storing bin and the shipping bin arrive at the picking station.

A method of controlling an automated warehouse system according to another aspect of the present disclosure, the automated warehouse system including: a rack for arranging at least one storing bin for storing at least one item; a plurality of picking stations for picking the item from one or more of the storing bins to one or more shipping bins for containing an item to be shipped; and a plurality of transportation robots for transporting the storing bin and the shipping bin, includes: controlling one or more of the transportation robots, by a controller, to separately transport, among the one or more shipping bins, at least a shipping bin for a first ship-to destination and a shipping bin for a second ship-to destination to the picking station; and controlling one or more of the transportation robots, by the controller, to transport the one or more storing bins to the picking station, the one or more storing bins each containing the item for the first ship-to destination and the second ship-to destination.

The items for the first ship-to destination and/or the second ship-to destination are contained in a plurality of the storing bins.

The method further includes controlling the transportation robot, by the controller, to transport the shipping bin in which the picking of the item is completed to the rack from the picking station.

The method further includes controlling the transportation robot, by the controller, to perform temporal evacuation of the shipping bin in which the picking of the item is not completed to the rack.

The transportation of the storing bins by the transportation robot having a longer distance or a longer time to the picking station is performed in priority.

The storing bins containing the items more frequently used for the picking of the items are located closer to the picking station prior to the picking of the items.

The method further includes, in a case where one or more of the storing bins are in a different picking station, the one or more storing bins storing the item necessary for the picking to the shipping bin in which the picking is not completed, controlling the transportation robot, by the controller, to perform transportation of the shipping bin in which the picking of the item is not completed to the picking station different from the picking station.

The rack includes a plurality of floors, the picking station defines a surface extending from a surface of one of the plurality of floors, and the transportation robot is travelable along the surface of the floor and the surface of the picking station.

The automated warehouse system includes a guide mechanism providing a guide indicating which one of the items is to be picked and from which one of the storing bins and to which one of the shipping bins the item is to be picked in the picking station, and the method of controlling the automated warehouse system further includes controlling the guide mechanism, by the controller, in accordance with the picking of the item.

The guide indicating which one of the items is to be picked is provided in an order of the picking becoming possible as the storing bin and the shipping bin arrive at the picking station.

BRIEF DESCRIPTION OF THE DRAWINGS

FIG. 7 is a table indicating order lines 1 to 3 to be handled in a first picking station 40;

DESCRIPTION OF THE EMBODIMENTS

Figure 1:
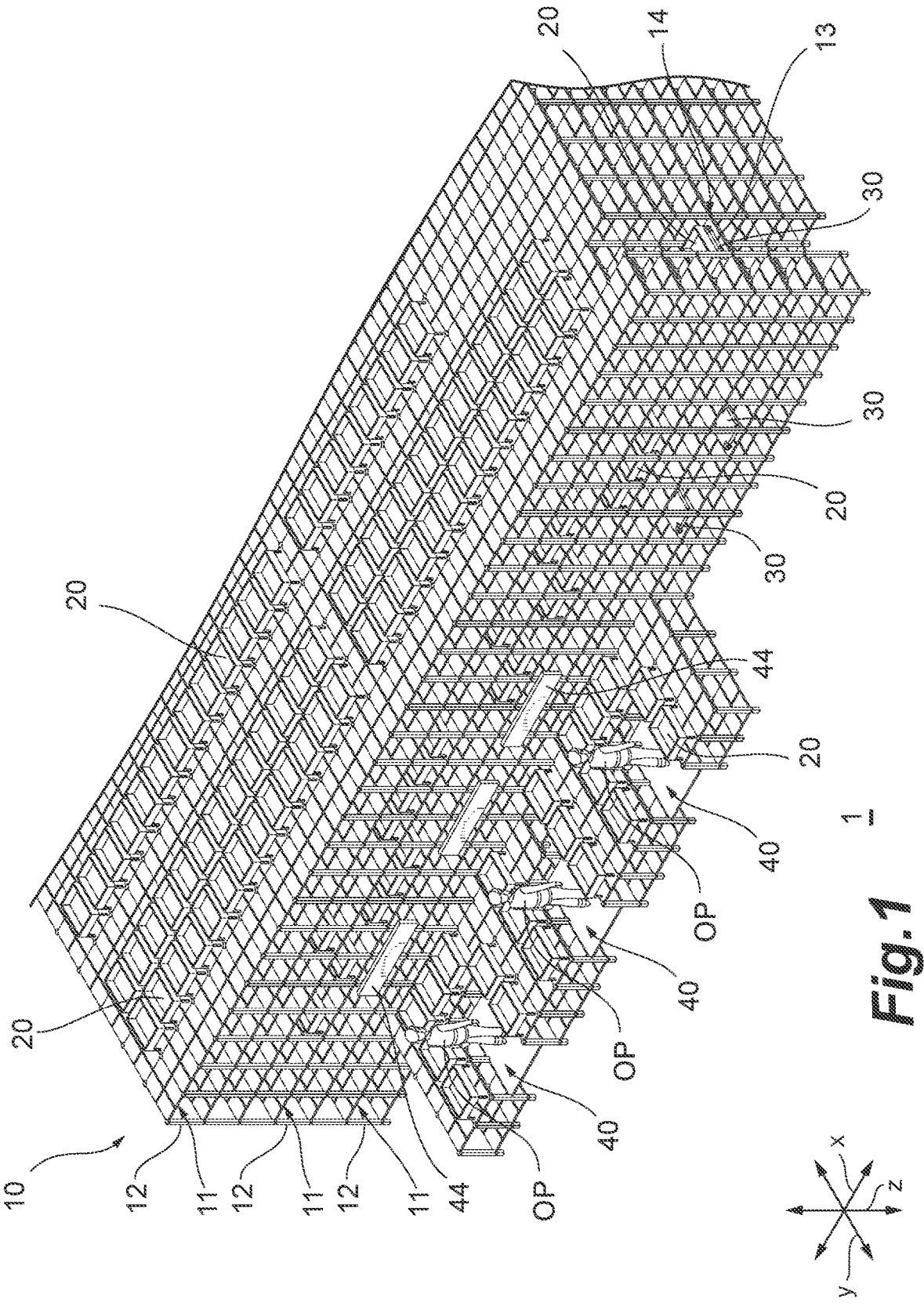
FIG. 1 is a perspective view schematically illustrating an automated warehouse system 1 according to an embodiment of the present disclosure.

Description will be made below on an embodiment of the present disclosure with reference to the attached drawings. The same reference numerals are used for referring to the same or similar components throughout all the drawings. A feature of the present disclosure will be described herein but alternations and modifications thereof are possible without departing from the spirit and scope of the embodiment as disclosed. Further, specific features, structures, or characteristics may be combined in any appropriate manner in one or more embodiments. The following detailed description is considered merely as an example and the true scope and spirit should be defined by claims.

Figure 2:
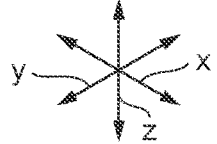
FIG. 2 is an enlarged partial perspective view schematically illustrating the automated warehouse system 1 according to the embodiment of the present disclosure.

FIG. 1 is a perspective view schematically illustrating an automated warehouse system 1 according to an embodiment of the present disclosure. FIG. 2 is an enlarged partial perspective view schematically illustrating the automated warehouse system 1 according to the embodiment of the present disclosure. The automated warehouse system 1 is an automated warehouse system capable of automating a series of works from entry of an item into a warehouse to storing and dispatch of the item in and from the warehouse on the basis of unified management, the item including a product or the like. The automated warehouse system 1 is built on a floor surface within, for example, a building (not illustrated). It should be noted that in the automated warehouse system 1, an x-axis direction and a y-axis direction extending in a horizontal direction and orthogonal to each other and a z-axis direction extending in a vertical direction and orthogonal to the x-axis direction and the y-axis direction are defined. The z-axis direction is a height direction.

Referring to FIG. 1 and FIG. 2 together, the automated warehouse system 1 includes a rack 10 located on, for example, the floor surface. The rack 10 includes a plurality of floors 11 and a plurality of support columns 12 supporting each of the plurality of floors 11. The plurality of floors 11 are stacked in the z-axis direction and each of the floors 11 defines a surface along an xy plane. Each of the floors 11 includes a plurality of floor panels 13 arranged adjacent to each other in the x-axis direction and the y-axis direction (see FIG. 2). The floor panels 13 include, for example, a resin material. Surfaces of the plurality of floor panels 13 are adjacent to each other in the x-axis direction and the y-axis direction and are flush with each other. The plurality of floor panels 13 define a flat surface of each of the floors 11.

As is apparent from FIG. 2, a shape of each of the floor panels 13 is defined as, for example, a quadrangle in a plan view. One section in the floor 11 is formed in a surface of each of the floor panels 13. Each of the floor panels 13 is supported by the support columns 12 at four corners of the floor panel 13. The floor panel 13 is attached to the support columns 12 and removable, for example, from above in the z-axis direction. The support columns 12 are rigid members extending in the z-axis direction. Each of the support columns 12 has a length corresponding to a height from one floor 11 to the next. The support columns 12 can be coupled to each other in the height direction. A lower end of the support column 12 located on an upper side in the z-axis direction can be coupled to an upper end of the support column 12 located on a lower side in the Z-axis direction.

One of the floor panels 13 and four of the support columns 12 supporting the four corners of the floor panel 13 define a minimum unit of the rack 10. The rack 10 can be constructed in various shapes in accordance with, for example, a shape of an interior space of a building by combining such minimum units in the x-axis direction, the y-axis direction, and the z-axis direction in various manners. It should be noted that the length in the z-axis direction of the support columns 12 supporting the floor panels 13 of the floor 11 corresponding to a lowermost level (a first level) is set smaller than that of the support columns 12 located on a second or higher level. The shorter support columns 12 cause the floor 11 corresponding to the first level to be raised from the floor surface to a predetermined height.

As illustrated in FIG. 1, the rack 10 includes one or more transportation elevators 14 and the transportation elevator 14 occupies one section of the floors 11. The transportation elevator 14 is movable between the floors 11 in the z-axis direction. The transportation elevator 14 includes one floor panel 13 and a drive mechanism (not illustrated) located in a lower portion of the floor panel 13. An operation of the drive mechanism serves to cause the floor panel 13 to move upward and downward in the z-axis direction along elevator shafts at four corners. The transportation elevator 14 may be located in, for example, a section inside the rack 10 and a plurality of transportation elevators 14 may be located in the rack 10. In addition, the transportation elevator 14 movable only between a part of the floors 11 may 11 may be located.

As is apparent from FIG. 2, respective two lines 15 are drawn on the surfaces of all the floor panels 13 constituting each of the floors 11 and the two lines 15 intersect each other at a center position between the x-axis direction and the y-axis direction in each of the floor panels 13. In this example, the two lines 15 are at a right angle to each other. In each of the floors 11, the plurality of floor panels 13 are arranged adjacent to each other in the x-axis direction and the y-axis direction and thus the respective lines 15 of the floor panels 13 define an x-axis line 16 extending in the x-axis direction and a y-axis line 17 extending in the y-axis direction. The x-axis line 16 and the y-axis line 17 each extend from edge to edge across the rack 10. For example, the lines 15 are colored white.

Figure 3:
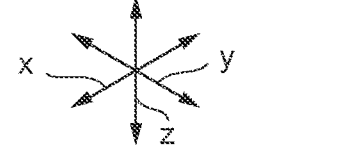
FIG. 3 is an enlarged partial perspective view schematically illustrating the automated warehouse system 1 according to the embodiment of the present disclosure.

FIG. 3 is an enlarged partial perspective view schematically illustrating the automated warehouse system 1 according to the embodiment of the present disclosure. Referring also to FIG. 3, one or more storing bins 20 for storing an item are placed on the floors 11 of the rack 10. The storing bin 20 includes, for example, a bin body 21 defining a containing space and four support legs 22 extending downward from four corners of a bottom surface of the bin body 21. In this example, an upper surface of the bin body 21 is open. One or more types of items 23 are contained in the containing space of the bin body 21. The types of items 23 are each identified by, for example, a unique stock keeping unit (SKU) assigned to the item 23. In addition, the storing bins 20 are identified by respective unique IDs assigned to the storing bins 20. The unique ID of each storing bin 20 is managed in association with the SKU of the item 23.

One storing bin 20 occupies one floor panel 13, or one section. An outline of the storing bin 20 is defined in, for example, a quadrangular shape in a plan view of the rack 10. The outline of the storing bin 20 in a plan view is placed inside an outline of the floor panel 13 also in a plan view. In addition, intervals between adjacent pairs of the support columns 12 are larger than respective lengths in the x-axis direction and in the y-axis direction of the storing bin 20. In addition, a height of the storing bin 20 is set smaller than a height between ones of the floors 11 adjacent to each other in the z-axis direction. A lower space is defined between a bottom surface of the bin body 21 of the storing bin 20 and the surface of the floor 11.

The automated warehouse system 1 includes one or more transportation robots 30 for transporting the storing bin 20. Each transportation robot 30 has an outline smaller than the outline of one floor panel 13 in a plan view. The transportation robot 30 is an autonomous transportation robot capable of autonomously traveling within the rack 10 with understanding a self-location on a map. The transportation robot 30 includes, for example, a plurality of drive wheels 31. The drive wheels 31 are, for example, mecanum wheels and thus the transportation robot 30 is movable in the x-axis direction and the y-axis direction without changing an orientation of the transportation robot 30. In addition, a line trace function allows the transportation robot 30 to travel on the surface of the floor 11 along the x-axis line 16 and the y-axis line 17.

The transportation robot 30 has, for example, a flattened cubic outer shape. An upper surface of the transportation robot 30 is defined as, for example, being flat. A height in the z-axis direction of an upper surface 32 of the transportation robot 30 is defined as being smaller than a height of the bottom surface of the bin body 21 of the storing bin 20. In addition, a side in each of the z-axis direction and the y-axis direction of the transportation robot 30 is set smaller than a distance between an adjacent pair of the support legs 22 of the storing bin 20. In other words, the transportation robot 30 is able to enter the lower space below the bin body 21 of the storing bin 20. The transportation robot 30 is thus also able to travel in the section of the floor panel 13 where the storing bin 20 is placed.

The transportation robot 30 is able to change a height of the transportation robot 30 between a first posture where the height of the upper surface 32 is set at a first height and a second posture where the height of the upper surface 32 is set at a second height higher than the first height. The transportation robot 30 in the first posture is able to enter the lower space below the bin body 21. The height of the transportation robot 30 is changed from the first posture to the second posture in the lower space, causing the transportation robot 30 to hold the bottom surface of the storing bin 20 at the upper surface 32. As a result, the support legs 22 of the storing bin 20 are lifted from the surface of the floor 11. The transportation robot 30 is able to travel on the floor panels 13 both in the first posture and in the second posture. Likewise, the transportation robot 30 is able to ride on the transportation elevator 14 both in the first posture and in the second posture.

Referring back to FIG. 1 and FIG. 2, the automated warehouse system 1 includes one or more picking stations 40 for sorting the item stored in the storing bin 20. The picking station 40 is formed integrally with the floor 11. In the present embodiment, for example, three of the picking stations 40 are defined. The transportation robot 30 transports the storing bin 20 placed on the floor 11 of the rack 10 to the picking station 40. In the picking station 40, an operator OP performs picking to take out a desired item from the storing bin 20.

Figure 4:
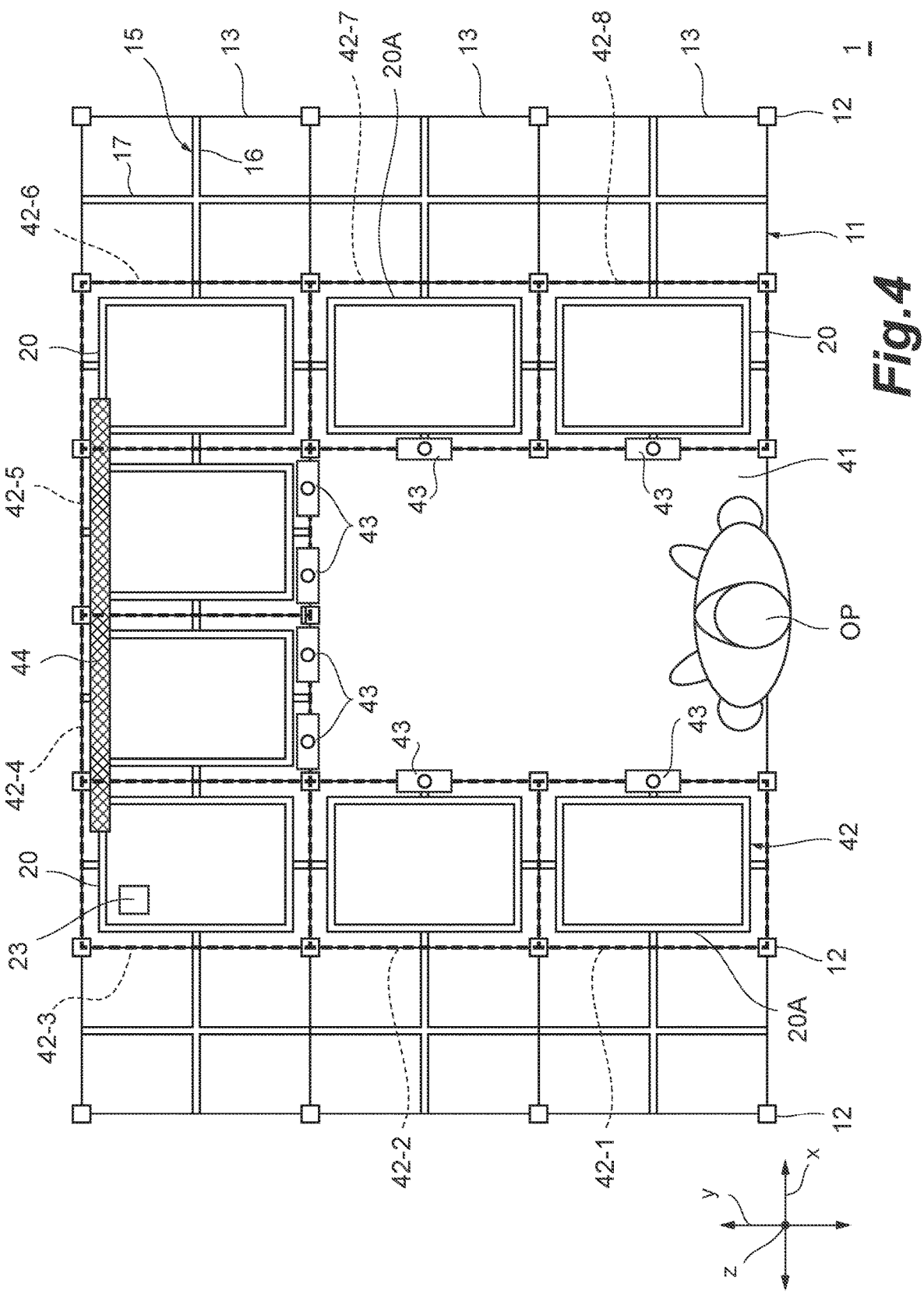
FIG. 4 is a plan view schematically illustrating a structure of a picking station 40 according to a specific example.

Referring to FIG. 2 and FIG. 4, the picking station 40 includes a workspace 41 for the operator OP to perform picking and a plurality of bin arrangement positions 42 defined around the workspace 41. The plurality of bin arrangement positions 42 surround the workspace 41 in a U-shaped manner in the x-axis direction and the y-axis direction. In this example, in the workspace 41, the floor 11 on which the operator OP stands is defined at, for example, a position higher than the floor 11 of the lowermost level (the first level). The picking station 40 defines a surface extending from the surface of the floor 11 of the second level. The workspace 41 is a space recessed inward from an outer periphery of the rack 10. It should be noted that none of the floors 11 of three and higher levels is formed in the picking station 40 in this example.

In this example, for example, eight of the bin arrangement positions 42-1 to 42-8 are defined in the surface of the floor 11 of the second level to surround the workspace 41 in a U-shaped manner in the x-axis direction and the y-axis direction. It is possible to arrange the above-described storing bin 20 and a shipping bin 20A for containing an item to be shipped at the bin arrangement positions 42-1 to 42-8. For example, a structure of the shipping bin 20A is the same as the structure of the storing bin 20. The storing bin 20 and the shipping bin 20A may each be placed at any one of the bin arrangement positions 42-1 to 42-8. In the workspace 41, the operator OP assorts the item 23 contained in the storing bin 20 to the shipping bin 20A.

A completion button 43 is located on an edge of the floor 11 of the second level around the workspace 41 at a position corresponding to each of the bin arrangement positions 42-1 to 42-8. The completion button 43 is connected to a later-described management server through wireless communication or wired communication. When completing transfer of the item 23 from the designated storing bin 20 to the designated shipping bin 20A, the operator OP presses the completion button 43 corresponding to the bin arrangement position 42 at which the shipping bin 20A is placed. In response to the completion button 43 being pressed, the management server is notified of completion of the transfer of the item 23. Meanwhile, a display device, namely display 44, is located in front of the workspace 41. Instructions are displayed on the display 44 as described later, the instructions indicating which and how many items 2 are to be transferred and from which storing bin 20 and to which shipping bin 20A this item 23 is to be transferred. The display 44 serves as a guide mechanism according to the present disclosure. The completion button 43 may be replaced by an automatic system, for example a camera guided tracking system that indicates to the management server when the items 23 are successfully transferred from one bin to another or when certain functional steps are to be triggered as disclosed herewith.

It should be noted that the operator OP may have, for example, a handy bar code reader (not illustrated). The bar code reader is able to scan and read, for example, a one-dimensional bar code or a two-dimensional bar code. For example, each item 23 is stuck with one of bar codes corresponding one-to-one to the above-described SKUs. In transferring the item 23 from the storing bin 20 to the shipping bin 20A, the operator OP is able to scan the bar code of the item 23 using the bar code reader. Information regarding the bar code completely scanned using the bar code reader is transmitted to the later-described management server. The management server checks whether or not the correct item 23 is transferred (picked).

Figure 5:
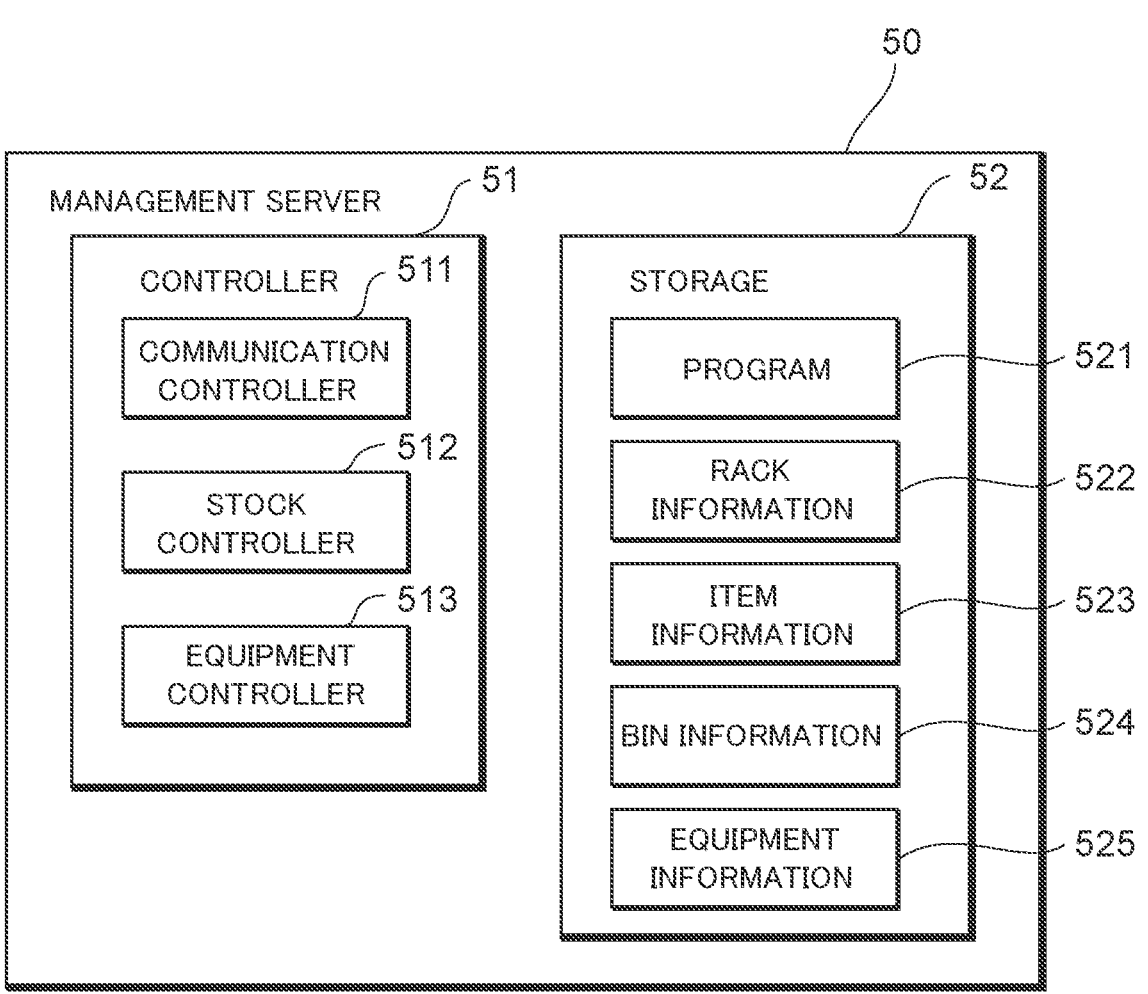
FIG. 5 is a functional block diagram schematically illustrating a configuration of a management server 50 according to the specific example.

As illustrated in FIG. 5, the automated warehouse system 1 includes a management server (a control system) 50 and the management server 50 manages operations and states of the storing bin 20, the shipping bin 20A, the transportation robot 30, and the picking station 40 for entry into, storing in, and dispatch from the automated warehouse system 1. The management is to be implemented by a controller executing a program stored in a storage as described later. Specifically, processes for the management are to be performed in line with information processing written in the program. In other words, the program is read by the controller, which causes the information processing written in the program to function as specific means provided by a cooperation of software related to the program and a variety of hardware resources of the automated warehouse system 1.

The management server 50 includes a controller 51 and a storage 52. The controller 51 includes a communication controller 511, a stock controller 512, and an equipment controller 513. Meanwhile, the storage 52 stores a program 521, rack information 522, item information 523, bin information 524, and equipment information 525. The controller 51 performs management of the automated warehouse system 1 by executing the program 521 stored in the storage 52. The management server 50 may be implemented by a physical server installed in, for example, a building or the rack 10 or may be implemented by, for example, a cloud server.

The communication controller 511 controls communication between the management server 50 and at least the transportation robot 30 and picking station 40. A communication method may be, for example, Wi-Fi® or Bluetooth®. The stock controller 512 manages a stock status in the automated warehouse system 1. Specifically, the stock controller 512 manages information (SKU) for identifying each item 2, information regarding a stock quantity of each item 23 specified by the SKU, information (ID) for identifying the storing bin 20 storing the item 23, and information regarding a position of a section of the floors 11 storing the storing bin 20 in association with one another. These pieces of information are all stored as the rack information 522, the item information 523, and the bin information 524 in the storage 52.

The equipment controller 513 manages and controls the operations of at least the transportation robot 30 and picking station 40. Specifically, the equipment controller 513 manages information for identifying the transportation robot 30 in association with a current state of the transportation robot 30, i.e., whether or not the transportation robot 30 is working on transportation, and, if so, information regarding order handling worked on by the transportation robot 30, or the like. These pieces of information are all stored as the equipment information 525 in the storage 52. Further, the equipment controller 513 manages information for identifying the picking stations 40 and information regarding an order for which a work of taking out an item is being performed in the picking station 40 in association with each other. These pieces of information are both stored as the equipment information 525 in the storage 52.

Further, the equipment controller 513 generates a command to the transportation robot 30 for each order to be handled by the automated warehouse system 1. Specifically, the equipment controller 513 specifies the storing bin 20 storing the item 23 indicated by the order and specifies the transportation robot 30 to be assigned to transport the storing bin 20 on the basis of the above-described pieces of information. The equipment controller 513 specifies a moving route for the transportation robot 30 to the section storing the storing bin 20 (a robot route) and a moving route for the transportation robot 30 from this section to a destination, or the picking station 40 (a bin route). These generated pieces of information are transmitted as a command to the transportation robot 30 via the communication controller 511.

Figure 6:
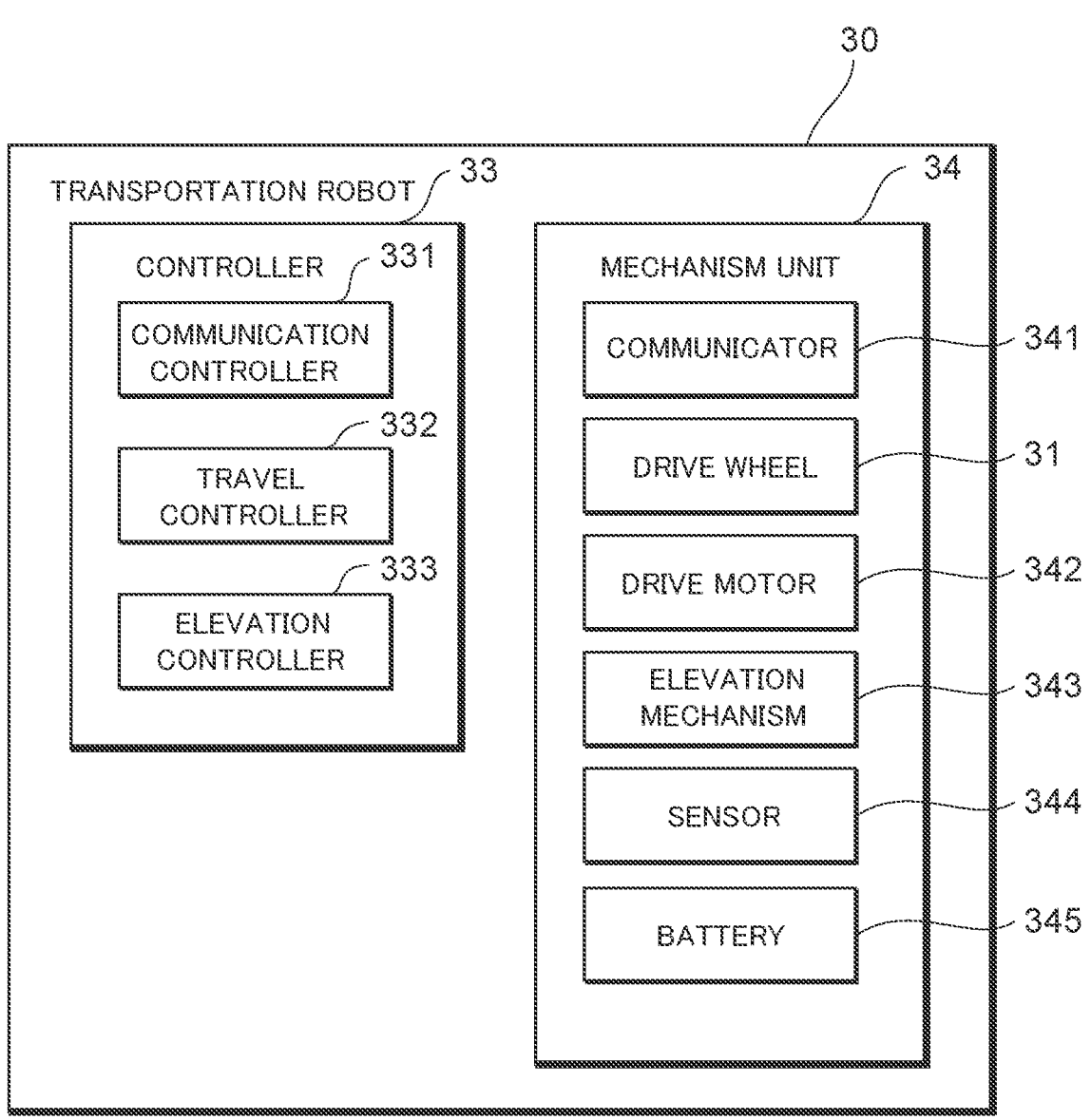
FIG. 6 is a functional block diagram schematically illustrating a configuration of a transportation robot 30 according to the specific example.

FIG. 6 is a functional block diagram schematically illustrating a configuration of the transportation robot 30. As illustrated in FIG. 6, the transportation robot 30 includes a controller 33 and a mechanism unit 34. The controller 33 includes a communication controller 331, a travel controller 332, and an elevation controller 333. The mechanism unit 34 includes a communicator 341, the plurality of drive wheels 31, a plurality of drive motors 342, an elevation mechanism 343, a sensor 344, and a battery 345. The controller 33 controls the operation of the transportation robot 30 by executing a program (not illustrated) stored in a storage (not illustrated). The program may be stored in a physical storage incorporated in the transportation robot 30 or may be stored on, for example, a cloud server.

The communicator 341 establishes communication with at least the management server 50 and the transportation elevator 14. A communication method may be, for example, Wi-Fi®, Bluetooth®, or light. The communication via the communicator 341 is controlled by the communication controller 331. The drive wheels 31 are wheels for enabling the transportation robot 30 to travel. The plurality of drive motors 342 cause the drive wheels 31 and the elevation mechanism 343 to be driven. The driving of the drive wheels 31 is controlled by the travel controller 332. The elevation mechanism 343 establishes a first configuration and a second configuration of the transportation robot 30. An operation of the elevation mechanism 343 is controlled by the elevation controller 333.

The sensor 344 is, for example, an optical sensor for implementing the above-described line trace function. Specifically, the sensor 344 is used for reading boundaries of the lines 15 drawn on each floor panel 13 to control the travel of the transportation robot 30 along the lines 15. In addition, the transportation robot 30 is able to specify a center position of each floor panel 13 by reading an intersection between the two x-axis line 16 and y-axis line 17. The transportation robot 30 is thus able to stop at, for example, the center position of each floor panel 13. The battery 345 is, for example, a rechargeable battery.

Now, description will be made on a dispatch process of the automated warehouse system 1 according to the embodiment of the present disclosure. FIG. 7 is a table indicating a specific example of order lines to be handled by the automated warehouse system 1. In this example, order lines 1 to 3 correspond to first to third ship-to destinations, respectively, and items A to E (the items 23) specified by the order lines 1 to 3 are to be picked to the respective shipping bins 20A to the first to third ship-to destinations. Here, it is assumed that the items A to E that need picking for the order lines 1 to 3 are contained in the separate storing bins 20. The controller 51 of the management server 50 performs handling of the order lines 1 to 3 by executing the program 521 stored in the storage 52.

Figure 8:
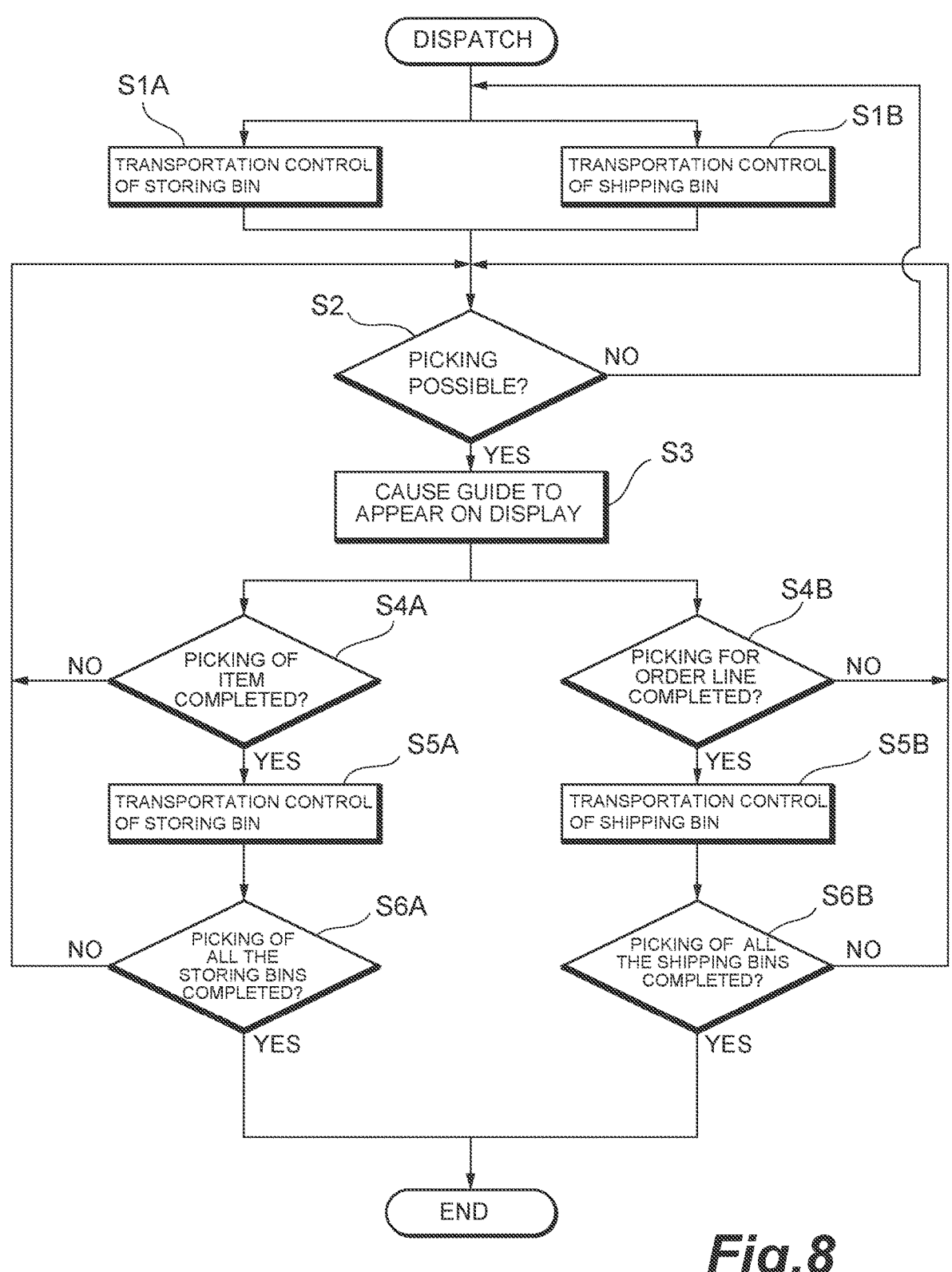
FIG. 8 is a flowchart for explaining a flow of a process of a controller 51.

FIG. 8 is a flowchart for explaining a process performed by the controller 51 of the management server 50. In this example, it is assumed that the handling of the order lines 1 to 3 is performed in a first picking station 40 of the three picking stations 40. At the start of the handling of the order lines 1 to 3, the controller 51 controls the transportation robot 30 to transport each of the respective storing bins 20 containing the items A to E to one of the bin arrangement positions 42-1 to 42-8 of the first picking station 40 (Step S1A). In addition, the controller 51 controls the transportation robot 30 to transport each of the respective shipping bins 20A to the first to third ship-to destinations to another one of the bin arrangement positions 42-1 to 42-8 (Step S1B). It should be noted that the shipping bins 20A are each assumed to be placed in one of the sections of the floors 11 of the rack 10 in this example.

When arriving at designated one of the bin arrangement positions 42-1 to 42-8, the transportation robot 30 notifies the communication controller 511 of the management server 50 that the transportation robot 30 has arrived at the designated bin arrangement position 42. Durations of time required for the storing bins 20 and the shipping bins 20A to arrive at the bin arrangement positions 42-1 to 42-8 may be different depending on distance to the first picking station 40. The controller 51 monitors whether or not a state allowing for picking of at least one of the items A to E specified by the order lines 1 to 3 is reached (Step S2). Specifically, the controller 51 monitors whether or not the storing bin 20 containing the needed item 23 has arrived at the first picking station 40 and whether or not the shipping bin 20A to which this item 23 is to be picked has arrived at the first picking station 40.

Figure 9:
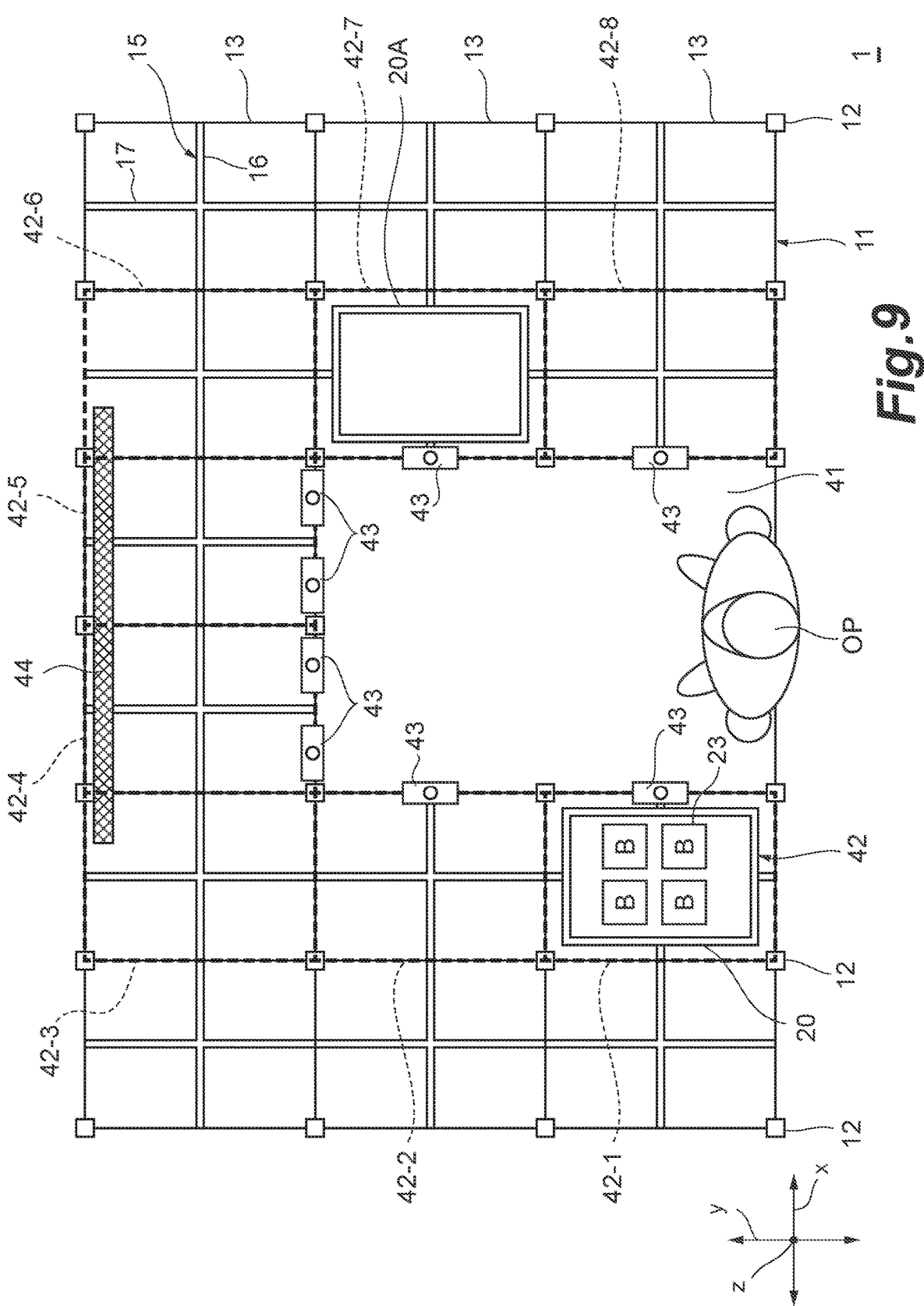
FIG. 9 is a plan view schematically illustrating a structure of the picking station 40 according to the specific example.

In response to the state allowing for picking being not reached (Step S2, NO), the process of the controller 51 returns to Step S1. In contrast, it is assumed that, for example, the shipping bin 20A for the first ship-to destination has arrived at the bin arrangement position 42-7 and the storing bin 20 containing the item B has arrived at the bin arrangement position 42-1 as illustrated in FIG. 9. In this case, for example, a state allowing for picking of the item B of the order line 1 from the storing bin 20 to the shipping bin 20A is reached (Step S2, YES). The controller 51 controls the display 44 to present the operator a guide regarding picking of the item B (Step S3).

Figure 10:
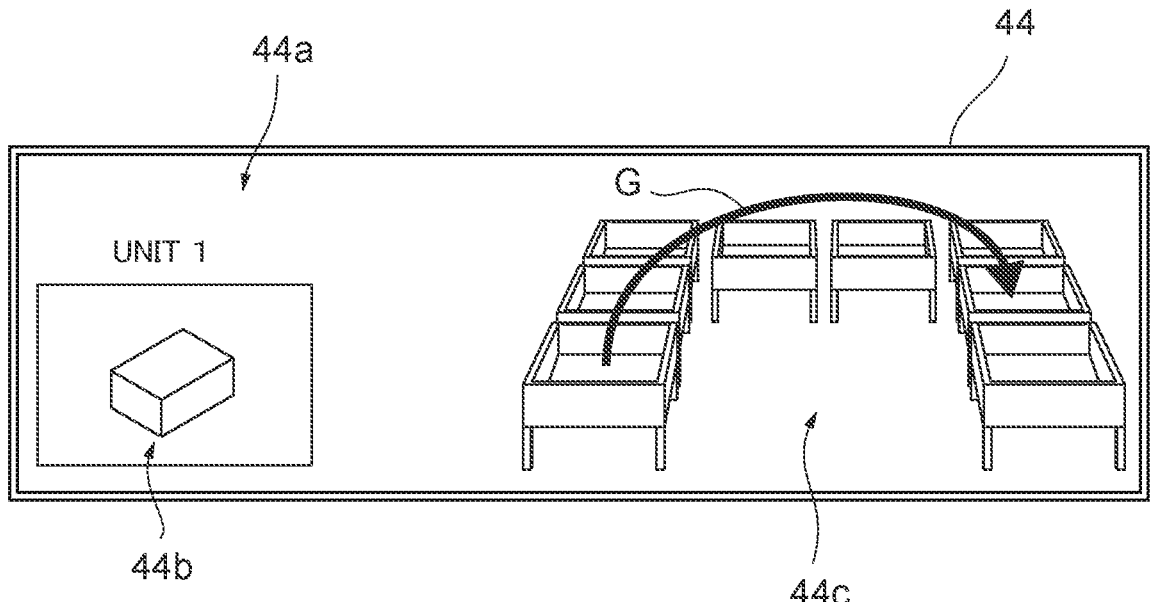
FIG. 10 is a diagram schematically illustrating a display screen of a display 44.

Specifically, the display 44 shows a guide indicating which and how many items 23 are to be picked, the bin arrangement position 42 of the storing bin 20 containing this item 23, and the bin arrangement position 42 of the shipping bin 20A to which this item 23 is to be picked as illustrated in FIG. 10.

The guide displayed on the display 44 includes, for example, a display image 44a of the number (unit) of the items B to be picked, a display image 44b of appearance of the item B to be picked, and a display image 44c of operation showing from which storing bin 20 and to which shipping bin 20A the item B should be picked. The display image 44a of the number is, for example, a numeric character. The display image 44b of appearance includes, for example, an image of an appearance of the item B shot in advance. The display image 44c of operation includes an arrow G from the storing bin 20 to the shipping bin 20A. The arrow G may be provided by, for example, an animation extending and retracting from the storing bin 20 toward the shipping bin 20A.

The operator OP takes the item B out of the storing bin 20 at the bin arrangement position 42-1 in line with the guide on the display 44 and scans a bar code on the item B using the handy bar code reader. The scanned information is transmitted from the bar code reader to the management server 50 through, for example, wireless communication and used for an inspection work of picking. When the scanning is completed, the operator OP transfers the item B into the shipping bin 20A at the bin arrangement position 42-7. When the transfer is completed, the operator OP presses the completion button 43 located at the bin arrangement position 42-7. A notification of the completion of picking of the item B is thus sent from the completion button 43 to the controller 51.

In response to receiving the notification of the completion of picking, the controller 51 determines whether or not handling of the storing bin 20 containing the item B is completed. Specifically, the controller 51 determines whether or not picking of the item B is fully completed (Step S4A). As illustrated in FIG. 7, the item B is also specified by the order line 2 (Step S4A, NO), so that the process of the controller 51 returns to Step S2. In other words, the storing bin 20 containing the item B remains at the bin arrangement position 42-1. Meanwhile, the controller 51 determines whether or not handling of the shipping bin 20A to which the item B is picked is completed. Specifically, the controller 51 determines whether or not picking for the order line 1 is completed (Step S4B). As illustrated in FIG. 7, picking of the item A for the order line 1 is not completed (Step S4B, NO), the process of the controller 51 returns to Step S2. In other words, the shipping bin 20A for the first ship-to destination remains at the bin arrangement position 42-7.

Subsequently, for example, when the shipping bin 20A for the second ship-to destination arrives at one of the bin arrangement positions 42-1 to 42-8, a state allowing for picking for the order line 2 is reached (Step S2, YES). The operator OP transfers the item B in line with the guide on the display 44 in the same manner as described above. In this case, as for the handling of the storing bins 20, picking of the item B is fully completed (Step S4A, YES), so that the process of the controller 51 advances to Step S5A. The controller 51 controls the transportation robot 30 to transport the storing bin 20 at the bin arrangement position 42-1 to predetermined one of the sections of the floors 11 in Step S5A. This transportation robot 30 is the same as the transportation robot 30 having transported the storing bin 20 to the first picking station 40 from the floor 11.

Subsequently, as for the handling of the storing bins 20, the controller 51 determines whether or not picking of the items 23 contained in all the storing bins 20 is completed (Step S6A). In this example, picking from the storing bins 20 containing the item A, the item C, the item D, and the item E is not completed (Step S6A, NO), the process of the controller 51 returns to Step S2. In contrast, in response to the completion of picking from all the storing bins 20 (Step S6A, YES), the handling of the storing bins 20 terminates.

Subsequently, for example, when the storing bin 20 containing the item A arrives at one of the bin arrangement positions 42, a state allowing for picking of the item A for the order line 1 from the storing bin 20 to the shipping bin 20A is reached (Step S2, YES). The operator OP transfers the item A in line with the guide on the display 44 in the same manner as described above. In this case, as for the handling of the storing bin 20, picking of the item A is fully completed (Step S4A, YES), so that the controller 51 controls the transportation robot 30 to transport the storing bin 20 containing the item A to predetermined one of the sections of the floors 11 in Step S5A. In contrast, in a case where picking of the items 23 contained in all the storing bins 20 is not completed (Step S6A, NO), the process of the controller 51 returns to Step S2.

The controller 51 also determines whether or not handling of the shipping bins 20A for any one of the ship-to destinations is completed. Specifically, the controller 51 determines whether or not picking for any one of the order lines is completed (Step S4B). As illustrated in FIG. 7, picking for the order line 1 is completed (Step S4B, YES), so that the process of the controller 51 advances to Step S5B. The controller 51 controls the transportation robot 30 to transport the shipping bin 20A for the order line 1 to predetermined one of the sections of the floors 11 in Step S5B. The predetermined section may be, for example, a section where the shipping bin 20A ready for shipment is to be temporarily evacuated in the rack 10. Incidentally, this section may also be used as the section where the storing bin 20 is placed.

Subsequently, as for the handling of the shipping bins 20A, the controller 51 determines whether or not picking of the items 23 to all the shipping bins 20A is completed (Step S6B). In this example, picking to the storing bins 20A for the order lines 2 and 3 is not completed (Step S6B, NO), the process of the controller 51 returns to Step S2. In contrast, in response to the completion of picking to all the shipping bins 20A (Step S6B, YES), the handling of the shipping bins 20A terminates.

As described hereinabove, the controller 51 repeats the processes in Steps S1 to S6. Thus, picking is dynamically performed in the first picking station 40 in an order of picking becoming possible. The operator OP only has to perform picking in line with the guide displayed on the display 44 to perform picking to the shipping bins 20A for a plurality of ship-to destinations in parallel. This makes it possible to reduce a waiting time of the operator OP. Therefore, by virtue of the automated warehouse system 1 according to the present disclosure, it is possible to perform picking with a significant efficiency. In addition, since the operator OP completes picking merely by working in line with the guide on the display 44, there is no necessity for the operator OP to recognize an order line.

Moreover, in the above-described automated warehouse system 1, the management server 50 is able to dynamically manage all the tasks including the control of the positions of the storing bin 20 stored on each floor 11 in the rack 10, the shipping bin 20A for a ship-to destination, and the transportation robot 30, the picking work of the operator OP in the picking station 40, and the like. For example, in a case where the plurality of picking stations 40 include a station with a higher rate of occupancy for the picking work and a station with a lower rate of occupancy, the controller 51 may perform, for example, a process to average the rates of occupancy. In addition, since the picking stations 40 are continuous with the floor 11, it is possible to easily and dynamically change location spaces and temporal evaluation spaces for the storing bin 20 and the shipping bin 20A. As for this dynamic change spaces, refer to the description regarding the step 44A discussed in paragraph 0071 below.

In the above-described embodiment, the controller 51 generates the moving route for the transportation robot 30 from the current section to the destination section and transmits the moving route to the transportation robot 30 at steps S1A and/or S1B in FIG. 8. A variety of conditions may be taken into consideration to generate the moving route. For example, the moving route may be generated such that the transportation robots 30 are allowed to avoid colliding with each other. In addition, the moving route may be generated such that the transportation robot 30 going to move a longer distance to the destination section is allowed to move in priority to another transportation robot 30 going to move a shorter distance to the destination section. Specifically, the movement of another transportation robot 30 likely to disturb the movement of the transportation robot 30 going to move a longer distance may be restricted or the moving route of the other transportation robot 30 may be modified. It should be noted that a case where the moving distance is long includes a case requiring movement from end to end of the floor 11.

In addition, for example, the location of the storing bin 20 storing the item 23 (SKU) specified by an order line to be handled may be dynamically changed. For example, the controller 51 searches, for example, all the order lines for the day to identify the number of times (a frequency) for each of the storing bins 20 to be required to handle all the order lines for one day and generates a list of ranking of the storing bins 20. The controller 51 is able to perform, on the basis of this list, a process to place the highly ranked storing bin 20 (i.e., the storing bin 20 required more frequently) closer to the picking station 4 in advance. For example, it is preferable that the storing bin 20 required more frequently be placed on the floor 11 of the same level (the second level) as the picking station 40. The moving distance of the storing bin 20 is reduced in this manner, which makes it possible to perform picking with a significant efficiency.

Incidentally, a placement work may be further dynamically performed depending on time required for order handling. Specifically, in a case where it is known that the storing bin 20 is scheduled to be frequently used for order handling but not used for a while, it is not necessary to immediately change the location of the storing bin 20 to be close to the picking station 40. For example, it is only sufficient that the location of the storing bin 20 is changed to be close to the picking station 40 at least immediately before order handling requiring the storing bin 20 is performed. The placement work is performed by using, for example, the free transportation robot 30 not engaged in order handling. It should be noted that in a case where, for example, another order line is added during handling of the order lines for the day, the list identifying the number of times (frequency) for each of the storing bins 20 to be required may be dynamically updated.

In addition, for example, in a case where one of the transportation robots 30 is to move from the current section of the storing bin 20 to the picking station 40, at steps S1A and/or S1B in FIG. 8, movement of the other transportation robots 30 may be dynamically controlled in accordance with a moving time of that transportation robot 30. Specifically, in a case where the moving route of the transportation robot 30 having a high priority of arrival includes, for example, a crowded area where many of the transportation robots 30 are placed, any of the transportation robots 30 existing on the moving route of the transportation robot 30 having a high priority may be controlled to give way to the transportation robot 30 having a high priority. It should be noted that the priority is set high in a case where, for example, the transportation robot 30 takes a longer time to move from the current section of the storing bin 20 to the picking station 40 than an estimated moving time.

It should be noted that the moving time of any of the transportation robots 30 can be estimated during generation of the moving route of the transportation robot 30 on the basis of a distance for the transportation robot 30 to move, the number of turns in direction, the level of the floor 11 on which the storing bin 20 is placed, whether or not the transportation elevator 14 is to be used, etc. In addition, for example, in a case where the target storing bin 20 is surrounded by other storing bins 20, it is necessary to move the other storing bins 20 to take out the target storing bin 20. In this case, the moving time of the transportation robot 30 for transporting the target storing bin 20 to the picking station 40 increases. Even in such a case, it is preferable that the priority of the target storing bin 20 be set high. It should be noted that the locations of the storing bins 20 having a high priority may be changed to be close to the picking station 40 prior to handling of the order lines as described above.

In addition, in the above-described embodiment, for example, at steps S1A, S1B, S5A and/or S5B in FIG. 8, it is preferable that, for example, the transportation robot 30 at the position closest to the section where the storing bin 20 is placed among the free transportation robots 30 not engaged in transportation of the storing bin 20 be used for transportation of the storing bin 20. However, in a case where another one of the free transportation robots 30 other than the transportation robot 30 at the closest position is determined to be more suitable for transportation for some reasons, a transportation process may be assigned to this free transportation robot 30. The transportation robot 30 to be used to transport the storing bin 20 may be fluidly determined in this manner. It should be noted that the transportation robot 30 to be used for the shipping bin 20A may likewise be fluidly determined. The flexibility of the automated warehouse system 1 can thus be improved.

It should be noted that the storing bin 20 remains at the bin arrangement position 42 when picking of the item 23 from this storing bin 20 is determined to be not completed in Step S4A in the above-described embodiment. However, for example, it would be expected that arrival of the shipping bin 20A to which this item 23 needs picking in the picking station 40 is delayed for some reason. In this case, the controller 51 may control the transportation robot 30 to cause the storing bin 20 containing this item 23 to be temporarily evacuated to the rack 10. A temporal evacuation position may be, for example, the section of the floor 11 of the second level adjacent to the picking station 40 or may be, for example, the section of the floor 11 of the first level or the third level near the picking station 40. It should be noted that temporal evaluation may be performed on the basis of the priority of the storing bin 20.

In addition, in a case where it is expected that arrival of the shipping bin 20A at the picking station 40 is delayed, the controller 51 may control the transportation robot 30 to cause the temporarily evacuated storing bin 20 to one of the bin arrangement positions 42 in accordance with expected time of the arrival. The temporal evacuation is performed by the same transportation robot 30. In a case where the storing bin 20 is expected to be used for picking after a certain amount of time, such temporal evacuation of the storing bin 20 makes it possible to avoid occupying the bin arrangement position 42. This makes it possible to facilitate an effective use of the bin arrangement position 42. Further, it is possible to perform more efficient picking.

In the above-described embodiment, when picking from the shipping bin 20A for the order line is determined to be not completed in Step S4B, this shipping bin 20A remains at the bin arrangement position 42. However, for example, the storing bin 20 containing the item 23 that needs picking to the shipping bin 20A would be already used in different one of the picking stations 40. In this case, the controller 51 may control the transportation robot 30 to transport the shipping bin 20A to the different picking station 40. By virtue of the transportation to the different picking station 40, picking is continued in this picking station 40. As a result, it is possible to perform more efficient picking. It should be noted that the storing bin 20 may be transported to different one of the picking stations 40 instead of the shipping bin 20A.

In the above-described embodiment, the guide mechanism is exemplified by the display 44. However, the guide mechanism may be incorporated in, for example, each of the storing bin 20 and the shipping bin 20A. Specifically, the guide mechanism may be implemented by a light source configured to cause the bin body 21 itself of each of the storing bin 20 and the shipping bin 20A to blink. For example, an LED panel may be incorporated as the light source in a bottom surface of the bin body 21. The LED panel may be connected to the management server 50 through, for example, wireless communication and the controller 51 may cause the bottom surface of each of the storing bin 20 and the shipping bin 20A for carrying the item 23 to blink in place of or in addition to the guide on the display 44. In addition, in response to the completion button 43 being pressed, the controller 51 controls the LED panel to stop blinking.

Herein, some embodiments of the subject of the present disclosure are disclosed and examples are referred to for the purpose of enabling those skilled in the art to implement an embodiment of the subject of the present disclosure, the embodiment including manufacturing and use of a device or a system and performing an incorporated method. However, the scope of the subject matter of the present disclosure should not be construed as being limited to the specific examples.

The invention claimed is:

1. A control system for an automated warehouse system, the control system comprising a controller controlling the automated warehouse system, the automated warehouse system including: a rack for arranging at least one storing bin for storing at least one item; a plurality of picking stations for picking the at least one item from one or more of the storing bins to one or more shipping bins for containing an item to be shipped; and a plurality of transportation robots for transporting the storing bin and the shipping bin, wherein a. the controller controls one or more of the transportation robots to transport, among the one or more shipping bins, at least a shipping bin for a first ship-to destination and at least a shipping bin for a second ship-to destination to a picking station of the plurality of picking stations, b. the controller controls one or more of the transportation robots to transport the one or more storing bins to the picking station, the one or more storing bins each containing the at least one item, for the first ship-to destination and the second ship-to destination, and c. the controller further controls one or more of the transportation robots to perform temporal evacuation of the one or more shipping bins, in which the picking of the at least one item is not completed, to a section of the rack adjacent to the picking station.

2. The control system for the automated warehouse system according to claim 1, wherein the items for the first ship-to destination and/or the second ship-to destination are contained in a plurality of the storing bins.

3. The control system for the automated warehouse system according to claim 1, wherein the controller further controls the transportation robot to transport the shipping bin in which the picking of the item is completed to the rack from the picking station.

4. The control system for the automated warehouse system according to claim 1, wherein the transportation of the storing bins by the transportation robot having a longer distance or a longer time to the picking station is performed in priority.

5. The control system for the automated warehouse system according to claim 1, wherein the storing bins containing the items more frequently used for the picking of the items are located closer to the picking station prior to the picking of the items.

6. The control system for the automated warehouse system according to claim 1, wherein in a case where one or more of the storing bins are in a different picking station, the one or more storing bins storing the at least one item necessary for the picking to the shipping bin in which the picking is not completed, the controller further controls the transportation robot to perform transportation of the shipping bin in which the picking of the item is not completed to the different picking station of the plurality of picking stations.

7. The control system for the automated warehouse system according to claim 1, wherein a. the rack includes a plurality of floors, b. the picking station defines a surface extending from a surface of one of the plurality of floors, and c. the transportation robot is travelable along the surface of the floor and the surface of the picking station.

8. The control system for the automated warehouse system according to claim 1, wherein a. the automated warehouse system includes a guide mechanism providing a guide indicating (a) which one of the items is to be picked and (b) from which one of the storing bins the item is to be picked, and (c) to which one of the shipping bins the item is to be picked, in the picking station, and b. the controller further controls the guide mechanism in accordance with the picking of the at least one item.

9. The control system for the automated warehouse system according to claim 8, wherein the guide indicating which one of the items is to be picked is provided in an order of the picking becoming possible as the storing bin and the shipping bin arrive at the picking station.

10. The control system for the automated warehouse system according to claim 1, wherein the picking station includes a workspace and a plurality of bin arrangement positions defined around the workspace.

11. A method of controlling an automated warehouse system, the automated warehouse system including: a rack for arranging at least one storing bin for storing at least one item; a plurality of picking stations for picking the at least one item from one or more of the storing bins to one or more shipping bins for containing an item to be shipped; and a plurality of transportation robots for transporting the storing bin and the shipping bin, the method comprising:

a. controlling one or more of the transportation robots, by a controller, to transport, among the one or more shipping bins, at least a shipping bin for a first ship-to destination and at least a shipping bin for a second ship-to destination to a picking station of the plurality of picking stations;

b. controlling one or more of the transportation robots, by the controller, to transport the one or more storing bins to the picking station, the one or more storing bins each containing the at least one item, for the first ship-to destination and the second ship-to destination; and c. controlling the one or more transportation robots, by the controller, to perform temporal evacuation of the one or more shipping bins, in which the picking of the at least one item is not completed, to a section of the rack adjacent to the picking station.

12. The method of controlling the automated warehouse system according to claim 11, wherein the items for the first ship-to destination and/or the second ship-to destination are contained in a plurality of the storing bins.

13. The method of controlling the automated warehouse system according to claim 11, the method further comprising controlling the transportation robot, by the controller, to transport the shipping bin in which the picking of the item is completed to the rack from the picking station.

14. The method of controlling the automated warehouse system according to claim 11, wherein the transportation of the storing bins by the transportation robot having a longer distance or a longer time to the picking station is performed in priority.

15. The method of controlling the automated warehouse system according to claim 11, wherein the storing bins containing the items more frequently used for the picking of the items are located closer to the picking station prior to the picking of the items.

16. The method of controlling the automated warehouse system according to claim 11, the method further comprising, in a case where one or more of the storing bins are in a different picking station, the one or more storing bins storing the at least one item necessary for the picking to the shipping bin in which the picking is not completed, controlling the transportation robot, by the controller, to perform transportation of the shipping bin in which the picking of the item is not completed to the picking station different from the picking station.

17. The method of controlling the automated warehouse system according to claim 11, wherein a. the rack includes a plurality of floors, b. the picking station defines a surface continuous with a surface of one of the plurality of floors, and c. the transportation robot is travelable along the surface of the floor and the surface of the picking station.

18. The method of controlling the automated warehouse system according to claim 11, wherein a. the automated warehouse system includes a guide mechanism providing a guide indicating which one of the items is to be picked and from which one of the storing bins and to which one of the shipping bins the item is to be picked in the picking station, and b. the method further comprising controlling the guide mechanism, by the controller, in accordance with the picking of the at least one item.

19. The method of controlling the automated warehouse system according to claim 18, wherein the guide indicating which one of the items is to be picked is provided in an order of the picking becoming possible as the storing bin and the shipping bin arrive at the picking station.

20. A computer-readable non-transitory storage medium storing instructions that, when executed by a computer, cause the computer to perform a method in an automated warehouse system, the automated warehouse system including: a rack for arranging at least one storing bin for storing at least one item; a plurality of picking stations for picking the at least one item from one or more of the storing bins to one or more shipping bins for containing an item to be shipped; and a plurality of transportation robots for transporting the storing bin and the shipping bin, the method comprising:

a. controlling one or more of the transportation robots, by a controller, to transport, among the one or more shipping bins, at least a shipping bin for a first ship-to destination and at least a shipping bin for a second ship-to destination to a picking station of the plurality of picking stations;

b. controlling one or more of the transportation robots, by the controller, to transport the one or more storing bins to the picking station, the one or more storing bins each containing the at least one item, for the first ship-to destination and the second ship-to destination; and c. controlling the one or more transportation robots, by the controller, to perform temporal evacuation of the one or more shipping bins, in which the picking of the at least one item is not completed, to a section of the rack adjacent to the picking station.

\* \* \* \* \*